(12) United States Patent
Romana et al.

(10) Patent No.: US 11,549,573 B2
(45) Date of Patent: Jan. 10, 2023

(54) EPICYCLIC GEAR MECHANISM FOR MULTIPLE INPUT/OUTPUT SYSTEMS

(71) Applicant: Woodward, Inc., Fort Collins, CO (US)

(72) Inventors: Roy Romana, Chicago, IL (US); Charles A. Crouch, Park Ridge, IL (US); Mariusz Kuczaj, Chicago, IL (US); Paul J. Smith, Park Ridge, IL (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 17/492,251

(22) Filed: Oct. 1, 2021

(65) Prior Publication Data

US 2022/0025963 A1  Jan. 27, 2022

Related U.S. Application Data

(63) Continuation of application No. 16/422,244, filed on May 24, 2019, now Pat. No. 11,137,057.

(51) Int. Cl.
*F16H 48/05* (2012.01)
*F16H 48/10* (2012.01)

(52) U.S. Cl.
CPC ............. *F16H 48/05* (2013.01); *F16H 48/10* (2013.01)

(58) Field of Classification Search
CPC .......... F16H 48/05; F16H 48/10; F16H 48/34; F16H 2048/106
See application file for complete search history.

(56) References Cited

U.S. PATENT DOCUMENTS

| | | | |
|---|---|---|---|
| 5,437,583 A * | 8/1995 | Shibahata | F16H 48/36 475/84 |
| 5,947,858 A | 9/1999 | Williams | |
| 7,708,665 B2 * | 5/2010 | Wheals | F16H 48/34 475/249 |

(Continued)

OTHER PUBLICATIONS

Int'l Preliminary Report on Patentability Appln. No. PCT/US2020/025904 dated Dec. 2, 2021.

(Continued)

*Primary Examiner* — Huan Le
(74) *Attorney, Agent, or Firm* — McAndrews Held & Malloy, Ltd.

(57) ABSTRACT

Methods and systems for an epicyclic gear mechanism that includes a primary differential assembly to selectively drive the fore secondary differential assembly and the aft secondary differential assembly. The fore secondary differential assembly selectively drives one or more fore interfaces (e.g., output gears), whereas the aft secondary differential assembly selectively drives one or more aft interfaces (e.g., output gears). Each of the primary differential assembly, the fore and aft secondary differential assemblies, and the interfaces rotate about a common central axis. The primary differential assembly drives the fore secondary differential assembly via a first sun gear, and drives the aft secondary differential assembly via a second sun gear, both of which rotate about the common central axis. Further, one or more actuators are to activate or deactivate in order to drive or be driven by a selected interface.

19 Claims, 7 Drawing Sheets

(56) References Cited

U.S. PATENT DOCUMENTS

| | | |
|---|---|---|
| 8,655,525 B2 | 2/2014 | Samie et al. |
| 9,671,003 B2 * | 6/2017 | Choi ..................... F16H 48/05 |
| 10,648,549 B2 * | 5/2020 | Kurth ..................... F16H 48/10 |
| 2006/0293141 A1 | 12/2006 | Sharma et al. |

OTHER PUBLICATIONS

Int'l Search Report and Written Opinion Appln. No. PCT/US2020/025904 dated Jul. 9, 2020.

* cited by examiner

EPICYCLIC GEAR MECHANISM FOR MULTIPLE INPUT/OUTPUT SYSTEMS

PRIORITY CLAIM/INCORPORATION BY REFERENCE

This application is a Continuation Application of U.S. Non-Provisional patent application Ser. No. 16/422,244, entitled "Epicyclic Gear Mechanism For Multiple Input/Output Systems" filed May 24, 2019, now U.S. Pat. No. 11,137,057, which is herein incorporated by reference in its entirety.

FIELD

Certain embodiments of the disclosure relate to an epicyclic gear mechanism for multiple input/output systems. More specifically, certain embodiments of the disclosure relate to an epicyclic gear mechanism that includes a primary differential assembly to selectively drive one or more secondary differential assemblies, each of which may selectively drive one or more interfaces. Advantageously, these differential assemblies and interfaces rotate about a single common axis.

BACKGROUND

Existing multi-branch gear designs, which do not rotate about a common central axis, are costly, heavy, and take valuable space in systems in which they are deployed.

Further limitations and disadvantages of conventional and traditional approaches will become apparent to one of skill in the art, through comparison of such systems with the present disclosure as set forth in the remainder of the present application with reference to the drawings.

BRIEF SUMMARY

A system and/or method is provided for an epicyclic gear mechanism to drive multiple outputs. In an example, an epicyclic gear mechanism includes a primary differential assembly to selectively drive a fore secondary differential assembly and an aft secondary differential assembly. The fore secondary differential assembly selectively drives one, more than one, or none of one or more fore interfaces, whereas the aft secondary differential assembly selectively drives one, more than one, or none of one or more aft interfaces. Each of the primary differential assembly, the fore secondary differential assembly, the aft secondary differential assembly and each of the primary, fore and aft interfaces rotate about a common central axis.

The primary differential assembly drives the fore secondary differential assembly via a first sun gear, and drives the aft secondary differential assembly via a second sun gear, both of which rotate about the common central axis. Further, one or more actuators are to activate or deactivate in order to drive a selected fore or aft interface, substantially as shown in and/or described in connection with at least one of the figures, as set forth more completely in the claims.

In disclosed examples, an epicyclic gear mechanism includes a fore secondary differential assembly to selectively drive one, more than one, or none of one or more fore interfaces. An aft secondary differential assembly selectively drives one, more than one, or none of one or more aft interfaces. A primary differential assembly selectively drives one, more than one, or none of the fore secondary differential assembly and the aft secondary differential assembly, wherein the primary differential assembly, the fore secondary differential assembly, the aft secondary differential assembly and each of the fore and aft interfaces rotate about a common central axis.

In some examples, one or more grounding mechanisms are included, each grounding mechanisms being configured to activate or deactivate a corresponding interface in response to a command.

In examples, the primary differential assembly is further configured to drive the fore secondary differential assembly via a first sun gear, and to drive the aft secondary differential assembly via a second sun gear. In some examples, the first sun gear and the second sun gear rotate about the common central axis.

In examples, the primary differential assembly includes a carrier having a primary interface configured to transfer torque to drive one or more of the fore or aft secondary differential assemblies in response to a mechanical input.

In some examples, the torque creates rotational movement of a primary carrier of the primary differential assembly causing one or more planet gears within the primary carrier to turn, thereby causing rotation of the first and/or second sun gear.

In examples, a fore carrier of the fore secondary differential assembly is in a fixed arrangement with the first sun gear, wherein one or more planet gears within the primary differential assembly are configured to drive the first sun gear causing rotation of the fore secondary differential assembly.

In some examples, the fore carrier includes one or more planet gears such that the rotational movement of the fore secondary differential assembly about the common central axis selectively causes the one or more planet gears to rotate about a planet shaft.

In examples, the one or more fore interfaces include one or more fore ring gears, the one or more planet gears within the fore carrier being configured to mesh with an interior gear of the one or more fore ring gears.

In some examples, a shaft in a fixed arrangement with the second sun gear is included, wherein one or more the planet gears within the primary differential assembly are configured to cause rotation of the aft secondary differential assembly by driving the second sun gear causing rotation of the shaft.

In examples, an aft carrier of the aft secondary differential assembly is included, the aft carrier including one or more planet gears such that rotational movement of the shaft turns the aft carrier about the common central axis selectively causing the one or more planet gears to rotate about a planet shaft.

In some examples, the one or more aft interfaces include one or more aft ring gears, wherein the one or more planet gears within the aft carrier are configured to mesh with an interior gear of the one or more aft ring gears. In examples, the interfaces are one or more of a gear, a belt, or a roller chain and sprocket.

In disclosed examples, an epicyclic gear mechanism includes a primary differential assembly having a plurality of planet gears to transmit motion to one, both or none of a first or a second sun gear, and a primary carrier with a fixed primary gear, the primary gear configured to transfer torque from a power source to the plurality of planet gears. A fore secondary differential assembly selectively driven by torque via the first sun gear and configured to selectively drive one, more than one, or none of one or more fore interfaces. An aft secondary differential assembly selectively driven by torque via the second sun gear and configured to selectively drive one, more than one, or none of one or more aft interface.

In some examples, the primary differential assembly, the fore secondary differential assembly, the aft secondary differential assembly and each of the fore and aft interfaces rotate about a common central axis.

In examples, the first sun gear and the second sun gear rotate about the common central axis. In some examples, the first sun gear and the second sun gear are arranged within the primary carrier.

In examples, a plurality of actuators are included to selectively activate or deactivate the one or more interfaces. In some examples, an interface selection device is included, wherein selection of a given interface activates a corresponding actuator to drive or be driven by the selected interface. In examples, the actuator engages a braking system corresponding to the selected interface. In some examples, the braking system includes one or more of a grounding mechanism, an electrically configurable brake or a mechanically configurable brake. In examples, the electrically configurable brake is actuated by application or removal of power to the electrically configurable brake, thereby engaging or disengaging the configurable brake. In some examples, the mechanically configurable brake is actuated by application or removal of a mechanical force including a linear force or a rotational force.

In disclosed examples, an epicyclic gear mechanism includes a primary differential assembly having a plurality of planet gears to transmit motion to one, both or none of a first or a second sun gear, and a primary carrier with a fixed primary gear, the primary gear configured to transfer torque from a power source to the plurality of planet gears. A fore secondary differential assembly is selectively driven by torque via the first sun gear and configured to selectively drive one, both or none of a first and a second tertiary differential assembly. And an aft secondary differential assembly selectively driven by torque via the second sun gear and configured to selectively drive one, both or none of a third and a fourth tertiary differential assembly, wherein each of the tertiary differential assemblies is configured to selectively drive a plurality of output ring gears.

In some disclosed examples, an epicyclic gear mechanism includes a fore secondary differential assembly to selectively engage one, more than one, or none of one or more fore interfaces. An aft secondary differential assembly selectively engages one, more than one, or none of one or more aft interfaces. And a primary differential assembly to selectively engage one, more than one, or none of the fore secondary differential assembly and the aft secondary differential assembly, wherein an interface of the one or more fore or aft interfaces is configured to selectively receive mechanical power from a power source and transfer mechanical power to drive one or more of the other fore or aft interfaces, and wherein the primary differential assembly, the fore secondary differential assembly, the aft secondary differential assembly and each of the fore and aft interfaces rotate about a common central axis.

In some examples, the other fore or aft interface transfers mechanical power to an external load.

In examples, the interface of the one or more fore or aft interfaces is configured to drive a primary interface of the primary differential assembly.

These and various other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

The figures are not necessarily to scale. Where appropriate, similar or identical reference numbers are used to refer to similar or identical components.

DETAILED DESCRIPTION

As utilized herein, "and/or" means any one or more of the items in the list joined by "and/or". For example, "x and/or y" means any element of the three-element set {(x), (y), (x, y)}. Similarly, "x, y, and/or z" means any element of the seven-element set {(x), (y), (z), (x, y), (x, z), (y, z), (x, y, z)}. As utilized herein, the term "module" refers to functions that can be implemented in hardware, software, firmware, or any combination of one or more thereof. As utilized herein, the term "exemplary" means serving as a non-limiting example, instance, or illustration.

Figure 1:
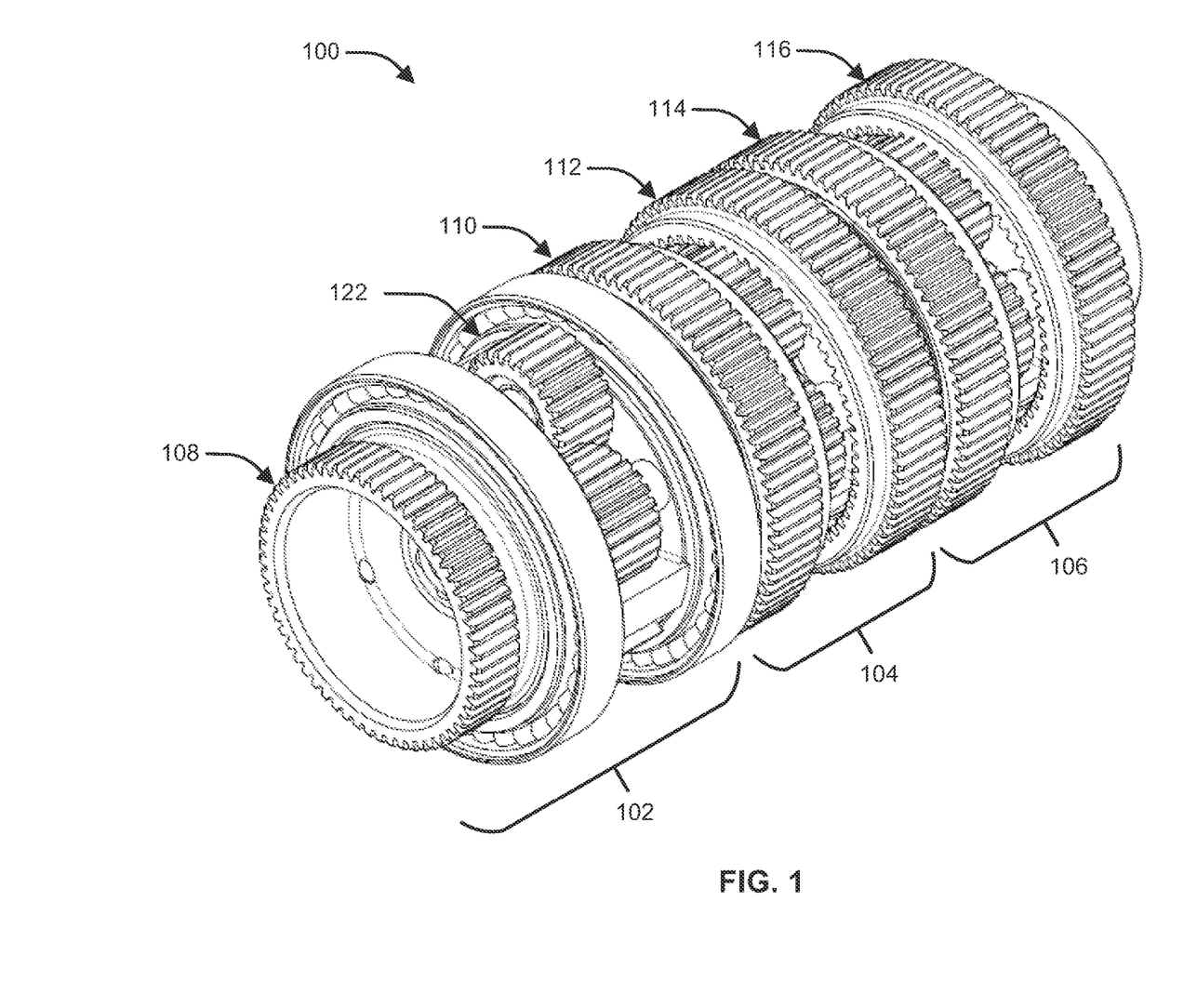
FIG. 1 is a perspective view of an epicyclic gear mechanism for multiple output systems, in accordance with an example embodiment of the disclosure.

FIG. 1 is a perspective view of a multi-branch epicyclic differential output mechanism 100, in accordance with an example embodiment of the disclosure. As shown, the mechanism 100 includes a primary differential assembly 102, a fore secondary differential assembly 104, and an aft secondary differential assembly 106. The primary differential assembly 102 includes a primary interface or gear 108 configured to be driven by a mechanical power source, such as a motor, via one or more gears, a clutch, a belting system, a roller chain and sprocket, or other suitable system. As shown, mechanism 100 provides a four-branch design, such that movement of the primary interface 108 drives one or more planet gears 122, which in turn provide mechanical power to one or more interfaces or annular output ring gears 110, 112, 114 and 116. As shown in the several figures, primary interface 108 and the one or more interfaces 110, 112, 114 and 116 may be configured as gears that mesh with another gear to transfer mechanical power. However, as provided herein, the several interfaces could be configured as one or more gears, a clutch, a belting system, a roller chain and sprocket, or other suitable system.

For example, the multi-branch epicyclic differential output mechanism 100 can use epicyclic gearing to selectively apply torque from the primary differential assembly 102 between the fore and aft differential assemblies 104, 106. As disclosed herein, the assemblies function as planetary gears as the axes of each planet gear 122 revolves around a common central axis (e.g., coaxial with the shaft). Further, as shown in the several figures, when activated, each output ring gear (e.g., interfaces 110, 112, 114 and 116) meshes with one or more rotating planet gears (e.g., planet gears 122A and 122B) of fore and aft differential assemblies 104, 106, respectively) of the respective fore or aft differential assemblies 104, 106, such that an interior of each output ring gear meshes with the exterior of a corresponding planet gear. For example, the multi-branch epicyclic differential output mechanism 100 has the advantage of being relatively compact along the length of the central axis (e.g., shaft 126 or sun gear 118), as well as limiting the bulk of the device. Although the example of FIG. 1 is illustrated as a four-branch design, fewer or more than four output rings are also possible. For example, each secondary differential assembly can be configured to drive a single output ring gear or three or more output rings by employing the concepts disclosed herein.

Additionally or alternatively, each interface 110, 112, 114 and 116 can be employed as an input. For example, a power source can drive one or more of the interfaces 110, 112, 114 and 116 to drive any other of the interfaces 110, 112, 114 and 116, as well as primary interface 108. In this manner, application of an actuator and/or braking system, as disclosed herein, serves to select a desired interface as an input (to transfer mechanical power from an external source to the mechanism 100) and/or an output (to transfer mechanical power from another interface to an external load).

Figure 2:
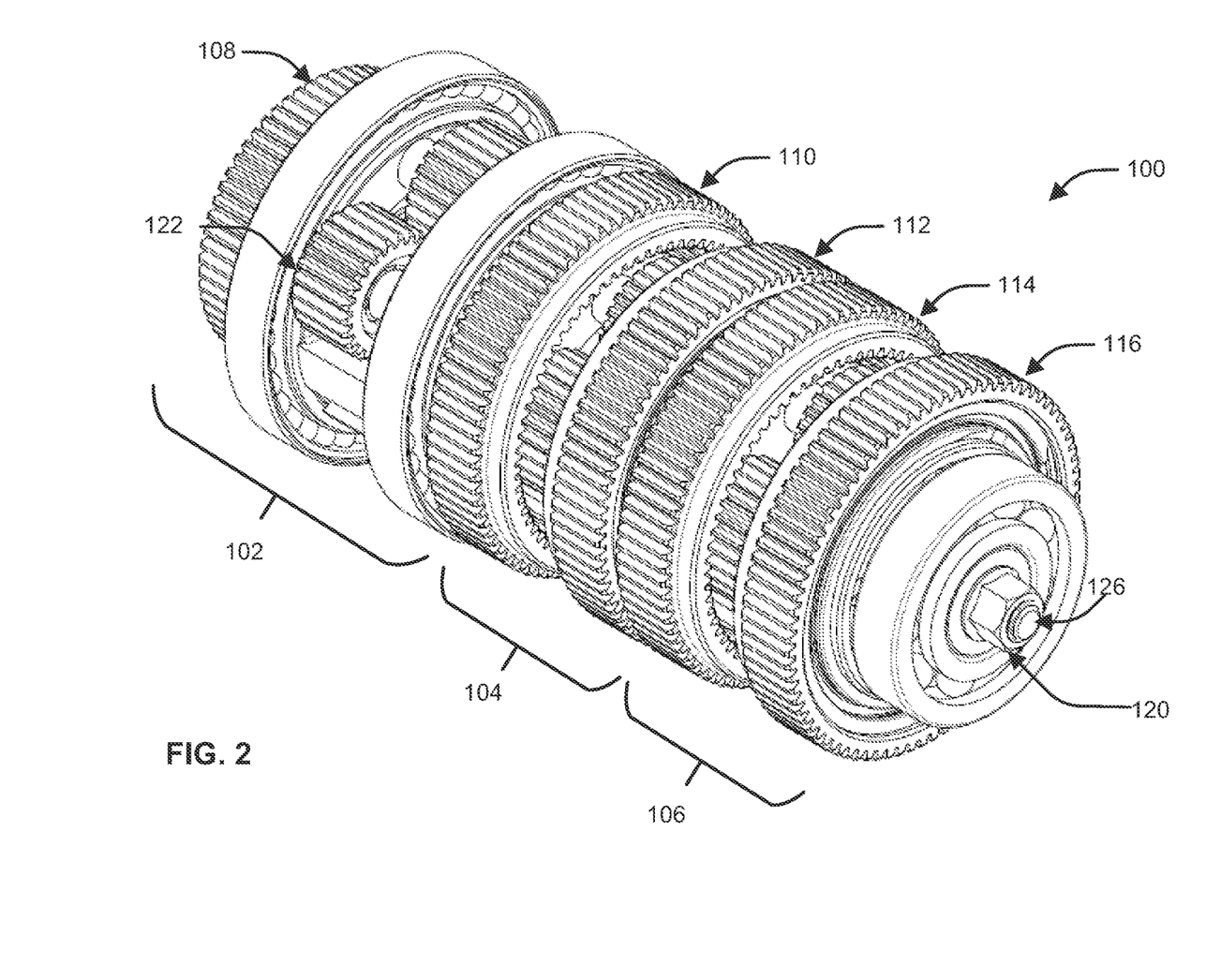
FIG. 2 is another perspective view of an epicyclic gear mechanism for multiple output systems, in accordance with an example embodiment of the disclosure.

FIG. 2 illustrates another perspective view of the multi-branch epicyclic differential output mechanism 100. As shown, a lock nut 120 serves as an axial retention feature for a shaft 126 that spans from the primary differential assembly 102, through fore secondary differential assembly 104 and to the aft secondary differential assembly 106.

Advantageously, the disclosed multi-branch epicyclic differential output mechanism 100 is designed to fit in a compact enclosure while providing multiple single-axis differentials. The compact design derives from employment of a single common axis about which the assemblies and outputs rotate, thereby delivering a power dense assembly configured to drive a plurality of outputs (e.g., interfaces 110, 112, 114 and 116). This compact design derives from employment of an in-line arrangement of multiple differentials, resulting in a relatively small number of bearings in comparison to multiple single axis differential arrangements. For example, in the mechanism 100, no sun gears mesh with secondary differential planet gears (e.g., 122A, 122B) and/or the multi-functional output ring gears (e.g., output ring gears 110, 112, 114 and 116). In particular, referring to FIGS. 3 and 4, the output ring gears 110, 112, 114 and 116 mesh with secondary planet gears 122A, 122B and input and/or output interfaces for a load (e.g., load 164 shown in FIG. 5).

As disclosed further below, selection of a particular output can be achieved via activation or deactivation of a braking system, grounding mechanism, or other suitable technique. For example, a configurable brake may include electrically or mechanically configurable brakes. Electrical brakes may be actuated by applying or removing power to their inputs, thereby engaging or disengaging the braking action. Mechanical brakes may be configured by mechanical force, such as by applying linear or rotational force to an input of the brakes.

In examples, the primary gear 108 that serves as an input/output interface (e.g., shown as a ring gear in FIG. 1) of the primary differential assembly 102 can be engaged or disengaged via a brake. Thus, as disclosed herein, when engaged, a corresponding sun gear will turn, causing rotation of a respective secondary differential assembly (e.g., fore secondary differential assembly 104, aft secondary differential assembly 106). As the one or more secondary differential assemblies rotate, one or more planet gears (e.g., planet gears 122A, 122B or planet gear assemblies) corresponding to a selected output ring gear (e.g., output ring gear 110, 112, 114, 116) can be activated by another brake. Such selective activation allows for rotation of the secondary differential assembly to transfer torque to the selected output gear via the one or more planet gears.

In one example, the configurable brakes may include power on brakes that are engaged by applying power to their inputs. In another example, the brakes may include power off brakes that are disengaged by applying power to their inputs. The power may be applied to the brakes by one or more control units. Thus, selection of an output and desired operation thereof, and activation or deactivation of the output via a braking system, results in selective control of multiple outputs provided by the disclosed multi-branch epicyclic differential output mechanism 100.

Figure 3:
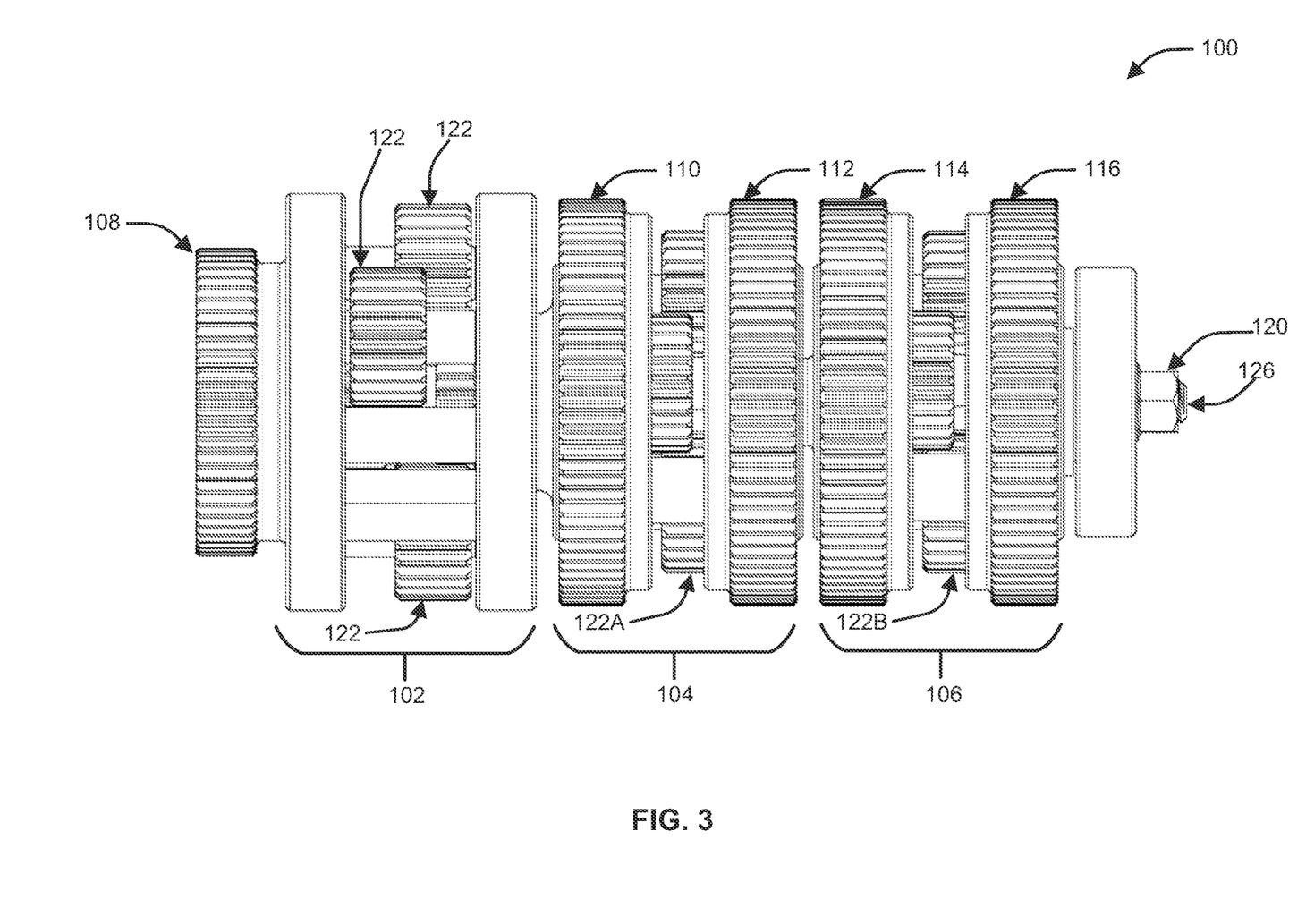
FIG. 3 is a lateral view of an epicyclic gear mechanism for multiple output systems, in accordance with an example embodiment of the disclosure.

FIG. 3 is a lateral view of multi-branch epicyclic differential output mechanism 100. As shown, multiple planet gears 122 are included with the primary differential assembly 102. For example, shaft 126 can extend through all or a portion of the length of the multi-branch epicyclic differential output mechanism 100, through the primary differential assembly 102, the fore secondary differential assembly 104 and aft secondary differential assembly 106. In this example, a sun gear 118 is fixed or otherwise connected to the shaft 126 and configured to mate with one or more planet gears 122 of the primary differential assembly 102 to drive the aft secondary differential assembly 106. Additionally or alternatively, sun gear 141 is also configured to mate with one or more planet gears 122 of the primary differential assembly 102 to drive the fore secondary differential assembly 104.

In some examples, the primary differential assembly 102 includes a cage or carrier 128 with primary interface or gear 108 formed thereon in a fixed arrangement, such that driving the primary interface or gear 108 serves to rotate the carrier 128. The primary differential assembly 102 can include one or more planet gears or planet gear assemblies 122 (e.g., four planet gears 122), each configured to rotate about a planet shaft. Each planet gear 122 can include one or more spacers, such as a long spacer and a short spacer, and one or more radial supports or rolling element bearings. One or more carrier radial supports or rolling element bearings can provide support for rotational movement of the primary differential assembly 102. Further, one or more carrier shaft radial supports can provide rolling element bearings for rotational movement of the shaft 126.

In some examples, the fore secondary differential assembly 104 includes a cage or carrier 142 configured to mate with one or more planet gears 122 of the primary differential assembly 102 via sun gear 141. Fore secondary differential assembly 104 similarly includes multiple planet gears or planet gear assemblies 122A, to rotate about one or more planet shafts. Output interfaces 110 and 112 are configured to be driven by the one or more planet gears 122A, and supported by radial gear supports. One or more gear retaining rings and/or bearing retaining rings may also be employed.

Additionally, as shown, aft second differential assembly 106 contains components similar to the fore secondary differential assembly 104, including a cage or carrier 152 configured to accept the shaft 126, such as via a port.

Figure 5:
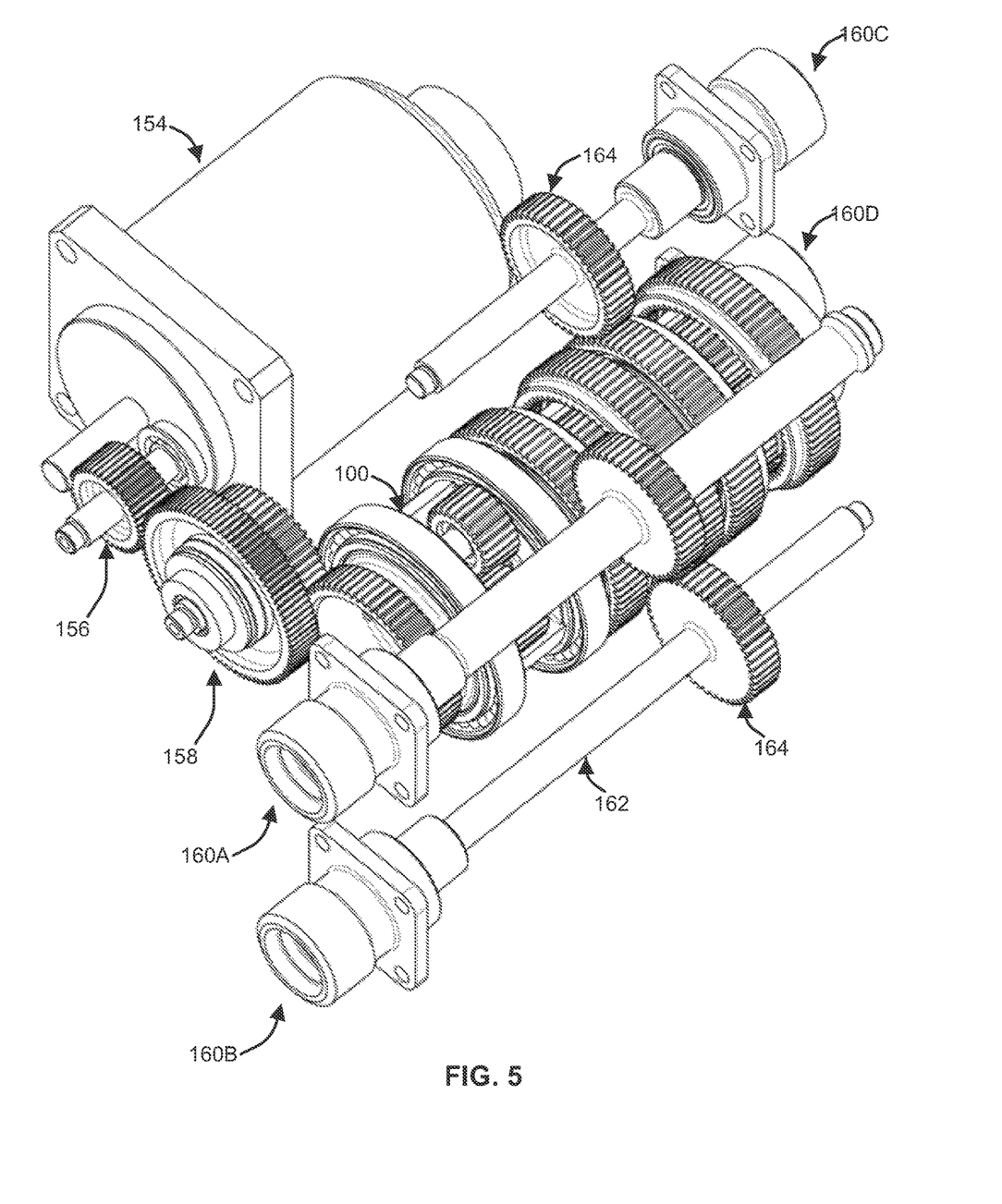
FIG. 5 is a perspective view of an epicyclic gear mechanism for multiple output systems including a mechanical power source, a power transmission, and one or more output shafts and corresponding shaft interfaces, in accordance with an example embodiment of the disclosure.

FIG. 5 is a perspective view of an assembled multi-branch epicyclic differential output mechanism 100 arranged to receive power from a mechanical power source 154 (e.g., a motor) via a power transmission system, for example, including one or more gears 156, 158. In an example, the motor 154 may include an electrical, hydraulic, or pneumatic motor. In the case of electric motors, it may include a brushless DC motor, brushed DC motor, AC induction motor, or stepper motor, although other motors may be utilized based on available space and power requirements, for example. In some examples, other transmissions may be employed, such as a clutch, belting system, or other systems or methods of transferring power from a power source.

As shown, one or more output shafts 162 include one or more gears 164 configured to mate with an output ring gear 110, 112, 114 or 116 of the mechanism 100, as disclosed herein. Thus, as the power source 154 drives the primary differential assembly 102, which causes one or more of the gears 164 to turn, an output is generated for one or more flexible torque shaft interfaces 160A through 160D, for example.

As disclosed herein, multiple output ring gears (e.g., output ring gear 110, 112, 114 or 116) can be selectively controlled to generate torque for a corresponding output (e.g., interfaces 160A through 160D). In operation, each output gear is controlled by a corresponding actuator (e.g., an electromechanical actuator), which may be individually enabled by the individual actuation of a control mechanism, such as a brake (e.g., through grounding). Thus, activation or deactivation of a corresponding actuator controls the supply of torque to a selected output ring gear through the mechanism 100 from the motor 154. While four outputs are shown in some examples, any number of outputs and corresponding actuators may be used depending on the differential gearing utilized and number of outputs desired, for example.

By contrast, conventional single-axis differential gearing is limited to a two-branch design. For example, a two-branch, speed summing differential gearing system can include a carrier or cage that is fixed to a differential input. The cage carries a set of intermeshing planet gears, which may be arranged in pairs. At the center of such an assembly, two sun gears mesh with corresponding planet gears. Each of the two sun gears are rigidly linked to a corresponding branch output, resulting in a two-branch differential. The carrier, planet gears and sun gears may be supported radially on one or more rolling elements, such as bearings or bushings. To configure the carrier to drive multiple branch outputs, multiple two-branch single-axis differential gearing modules must be used. Further, such modules must be modified to accommodate the desired number of multiple branches in a parallel arrangement. The resulting device has a large envelope and increased weight, which makes the entire packaging ineffective or impractical for a variety of applications (e.g., aerospace).

Figure 4:
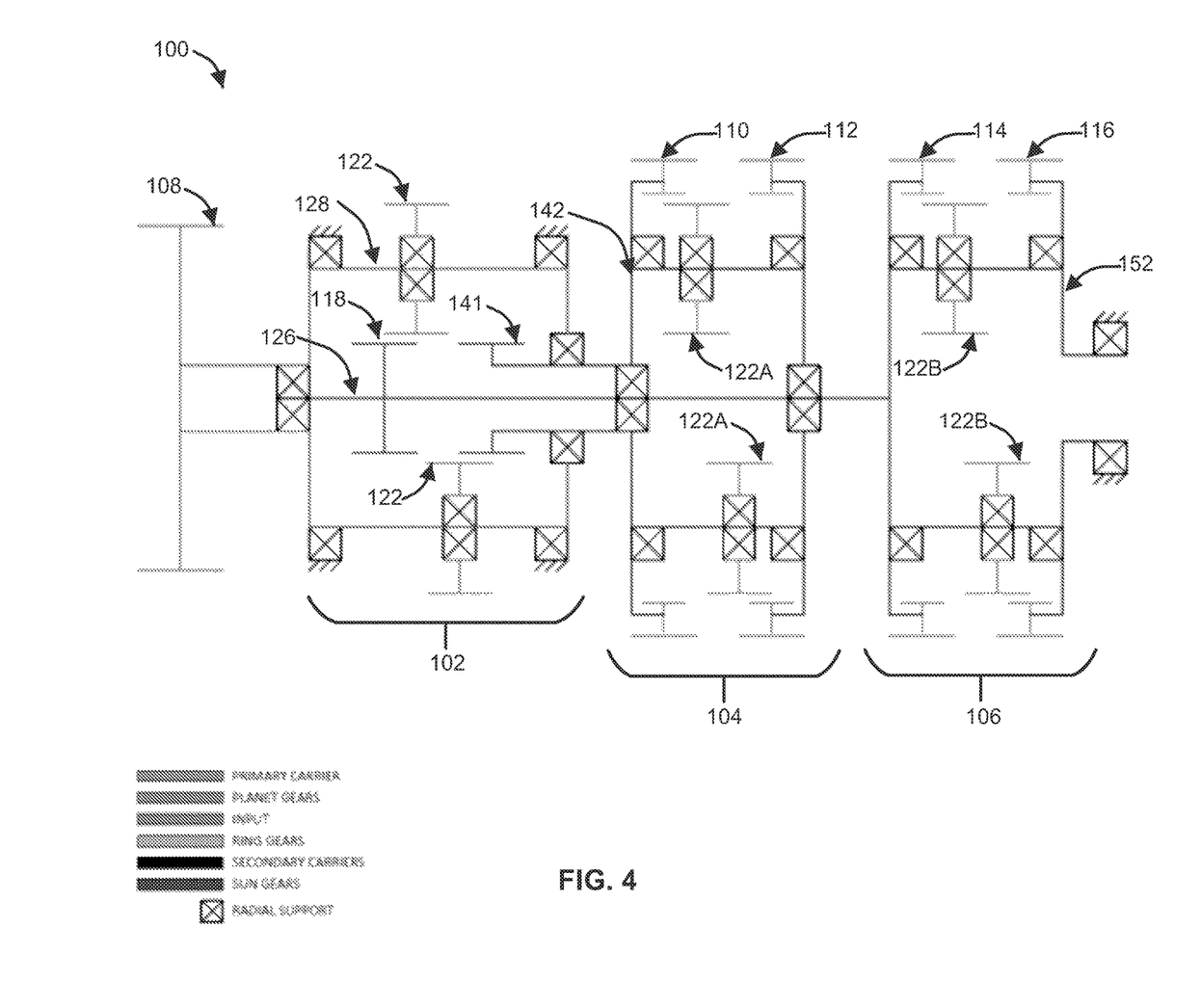
FIG. 4 illustrates a schematic of a four output branch differential gear train of an epicyclic gear mechanism, in accordance with an example embodiment of the disclosure.

FIG. 4 illustrates a schematic of a four output branch differential gear train of an epicyclic gear mechanism 100, in accordance with an example embodiment of the disclosure. For example, as the primary gear 108 is driven by a power source, one or more of the planet gears 122 within the primary differential assembly 102 can be configured to drive the gear 141 and carrier 142 of the fore secondary differential assembly 104. The rotational movement of the carrier 142 thereby turns one or more planet gears 122A within assembly 104 which, when activated, can turn corresponding output ring gears 110, 112.

Additionally or alternatively, one or more of the planet gears 122 within the primary differential assembly 102 can be configured to drive the gear 118 and carrier 152 of the aft secondary differential assembly 106 by rotation of the shaft 126. For example, rotational movement of the shaft 126 drives the carrier 152, causing one or more planet gears 122B to turn. Similarly, when activated, the planet gears 122B can turn one or both of corresponding output ring gears 114, 116.

As shown in FIG. 4, the primary differential assembly 102 (e.g., a main cage) is configured to drive two or more intermeshing planet gears 122, while being fixed to a differential input. In other words, the planet gears 122 mesh with corresponding sun gears 118, 141, which are linked to the fore and aft secondary differential assemblies 104, 106. Sun gear 118 within the primary differential assembly 102 is linked to the aft secondary differential assembly 106 through rigid shaft 126. The aft secondary differential assembly 106 then interfaces with the shaft 126 through an anti-rotation feature, such as a spline, square and/or a hex. The shaft 126 guides the aft secondary differential assembly 106, which is secured thereto with a lock nut 120 (see, e.g., FIG. 3).

Sun gear 141 is arranged within the interior of the primary differential assembly 102. As shown, sun gear 141 is rigidly linked to the carrier 142 of the fore secondary differential assembly 104, which is then radially supported by rolling element bearings or bushings on the rigid shaft 126. Each carrier 142 and 152 of the fore and aft secondary carriers, respectively, contain another set of intermeshing planet gears 122A and 122B, respectively, which are configured to mesh with a corresponding output ring gear 110, 112, 114, and 116, in a nesting arrangement. Each output gear 110, 112, 114, and 116 may feature an internal gear and/or an external gear. The internal gear meshes with the planet gears 122A and 122B, while the external gear serves as the branch external interface point (e.g., to drive a load mated with the external gear). Each carrier, planet gear, sun gear, and ring gear are radially supported by rolling element to provide a rigid and mechanically efficient package, while rotating about a common central axis.

An advantage of the disclosed multi-branch epicyclic differential output mechanism is the compact size achieved through the specific arrangement of the primary and secondary differential assemblies and the use of ring gears that feature both internal and external gears. This particular design approach also reduces the number of support bearings required versus a more traditional way of achieving multiple branch outputs, as described above. The compact size of this design leads to other advantages when the device is integrated within a larger torque distribution assembly, where its compact envelope and versatility of placement provide a significant advantage for use in constricted spaces.

Figure 6:
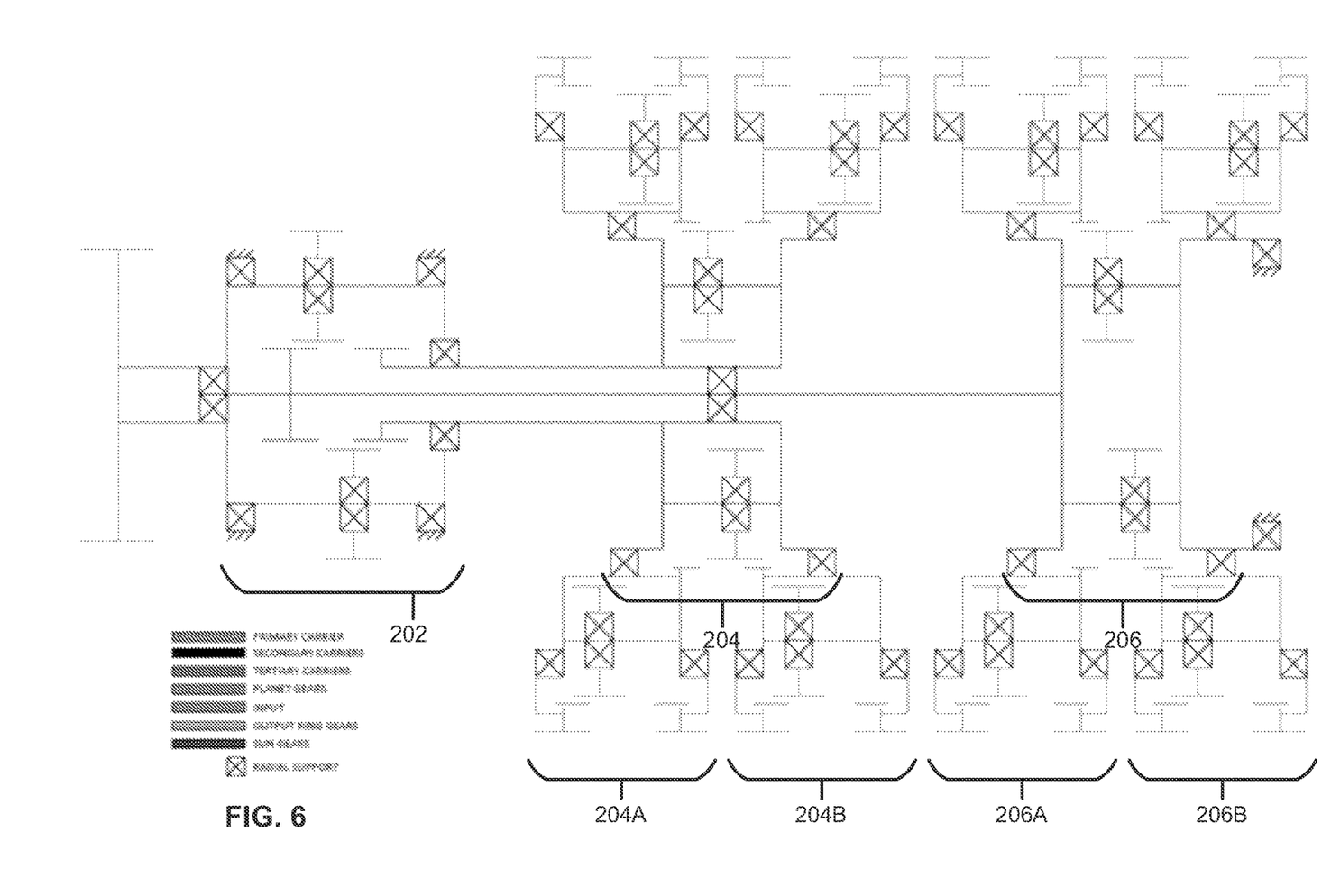
FIG. 6 illustrates a schematic of an eight output branch differential gear train of an epicyclic gear mechanism, in accordance with an example embodiment of the disclosure.

FIG. 6 illustrates a schematic of an eight output branch differential gear train of an epicyclic gear mechanism, in accordance with an example embodiment of the disclosure. As shown, a primary differential assembly 202 is arranged in a manner similar to the mechanism 100 described with respect to FIGS. 1-5. Thus, the primary differential assembly is configured to selectively drive a fore differential assembly 204 and an aft secondary differential assembly 206, as shown. In the example of FIG. 6, each of the fore differential assembly 204 and aft secondary differential assembly 206 is configured to drive a plurality of tertiary differential assemblies 204A, 204B, 206A, 206B (e.g., two tertiary differential assemblies driven by each secondary differential assembly). Selection and power distribution of the mechanism illustrated in FIG. 6 can be implemented via methods described with reference to the multi-branch epicyclic differential output mechanism 100.

Figure 7:
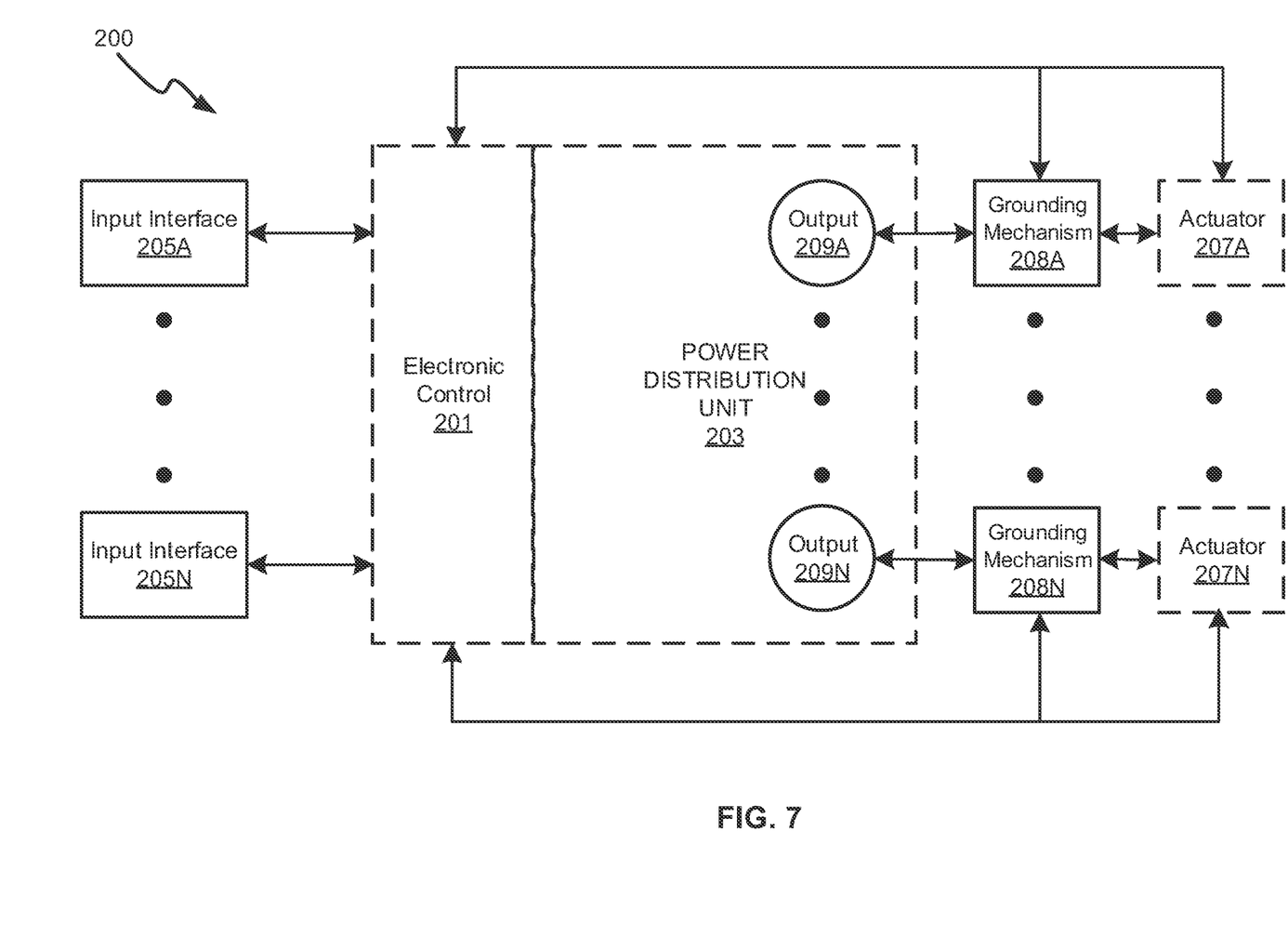
FIG. 7 illustrates a schematic of an electromechanical actuator control system for an epicyclic gear mechanism for multiple output systems, in accordance with an example embodiment of the disclosure.

FIG. 7 illustrates a schematic of an electromechanical actuator control system for a multi-branch epicyclic differential output or gear mechanism, in accordance with an example embodiment of the disclosure. Referring to FIG. 7, there is shown control system 200 including an electronic control unit (ECU) 201, power distribution unit (PDU) 203, input interfaces 205A-205N, actuators 207A-207N, and output interfaces 209A-209N. One or more of the inputs/outputs 209A-209N or (optionally) actuators 207A-207N may connect to one or more grounding mechanisms 208A-208N to engage or disengage a brake to activate a selected input/output interface or gear. In some examples, the inputs/outputs 209A-209N are integrated with the PDU 203. In other examples, the inputs/outputs 209A-209N and/or grounding mechanisms 208A-208N are operably linked to the PDU 203. In some examples, selection of inputs/outputs 209A-209N is controlled via the ECU 201, in addition or in the alternative to PDU 203, such as via grounding mechanisms 208A-208N and/or actuators 207A-207N.

In accordance with the example mechanism 100 disclosed herein, inputs/outputs 209A-209N (e.g., interfaces, such as output ring gears) may be coupled to the actuators 207A-207N (e.g., electromechanical actuators) to enable actuation, such as by engaging or disengaging a brake. The PDU 203 operates to actuate the actuators 207A-207N. In examples, a single PDU 203 is operable to control multiple actuators 207A-207N, as opposed to each actuator containing a motor and controller, as with conventional systems. The combination of the differential gearing, electro-mechanical brakes for each output ring gear and the control unit act as an actuator selector mechanism for a desired output, as is disclosed with respect to the several drawings.

In the illustrated example, the ECU 201 may include an electronic control processor operable to receive input signals from sensor(s) and/or limit switches in the actuators 207A-207N, and also receive user inputs such as from the input interfaces 205A-205D. Based on information from the input interfaces, the ECU 201 may provide output signals to the actuators 207A-207N via the power distribution unit 203. The ECU 201 may be within or coupled adjacent to the power distribution unit 203.

The electrical interfaces 205A-205D may include electronic or electromechanical switches for indicating when an output is to be activated or deactivated. This may include a control panel of switches, a touchscreen display, and/or discrete buttons or switches, for example. Differential gearing from the power distribution unit 203 (e.g., via activation of the mechanism 100) may enable multiple actuators to be driven by a single PDU.

In order to control each output, each corresponding grounding mechanism 208A-208N may include an electrically configurable brake for locking, or "grounding," each output of the differential gearing, so that only the particular actuator with its brake disengaged receives power to drive the selected output 209A-209N. For example, a control system, logic sequence, and/or a user may activate a desired output. In an example, a user may press a button on a control panel coupled to or part of the electrical interfaces 205A-205D, sending a control signal from the respective electrical interface to the ECU 201 in or coupled to the power distribution unit 203.

In some examples, the grounding mechanism 208A-208N is activated via actuators 209A-209N. For instance, the ECU 201 may send an electrical signal to a selected grounding mechanism 208A-208N via a corresponding actuator of the actuators 207A-207N, which may engage a power source (e.g., motor 154 as provided in FIG. 5) of the PDU 203. The electrical signal sent to the selected actuator may disengage a brake such that the selected differential gearing in the PDU 203 can provide power to the activated actuator and associated output. For the example shown in FIG. 5, the motor 154 may be controlled by the ECU 201, and may provide torque for the output ring gears of the mechanism 100 via the gearing system 156, 158. A slip clutch may be provided to limit the torque from the motor 154 to avoid excessive torque being provided. Gearing system 156, 158 may include multiple mechanical gear components to provide a gear ratio between input and output shafts (e.g., between the motor 154 and differential output or gear mechanism 100) so as to step up or down the rotational speed.

In some examples, the grounding mechanism(s) 208A-208N can be incorporated or integrated with a corresponding actuator, and are controlled via commands to the actuator. In additional or alternative examples, the grounding mechanism(s) 208A-208N are responsive to commands directly from the ECU 201. Thus, a grounding mechanism can be controlled directly via the ECU 201 without the use of an actuator.

The brakes may include electrically or mechanically configurable brakes. In an example, the brakes include power-off brakes that disengage with power applied and stay engaged with no power applied. In another example, the brakes include power on brakes that are engaged by applying power to their inputs. The power may be applied to the brakes by the ECU 201. The ECU 201 may include a processor, for example, and associated electronics, for receiving input signals and generating output signals to the PDU 203 based on programming stored in the ECU 201. Moreover, in some examples, a mechanical input can be used to engage and/or disengage a mechanically configurable brake.

Certain aspects of the disclosure may be found in a method and system for an epicyclic differential output mechanism for multiple outputs. Exemplary aspects of the disclosure may include an epicyclic gear mechanism that includes a primary differential assembly to selectively drive the fore secondary differential assembly and the aft secondary differential assembly. The fore secondary differential assembly selectively drives one or more fore interfaces (e.g., output gears), whereas the aft secondary differential assembly selectively drives one or more aft interfaces (e.g., output gears). Each of the primary differential assembly, the fore and aft secondary differential assemblies, and the interfaces rotate about a common central axis. The primary differential assembly drives the fore secondary differential assembly via a first sun gear, and drives the aft secondary differential assembly via a second sun gear, both of which rotate about the common central axis. Further, one or more actuators are to activate or deactivate in order to drive a selected interface.

With reference to the several figures, multiple advantages are achieved through the innovative epicyclic gear mechanism disclosed herein. For example, a compact size is achieved through the specific arrangement of the primary and one or more secondary carriers, as well as the use of interfaces such as output ring gears featuring both internal and external gears. This particular design approach also reduces the number of support bearings required for driving multiple outputs, compared to conventional ways of achieving multiple branch outputs as described above. The compact size of this design leads to other advantages, for example, its compact envelope and placement versatility provide significant advantages for use in constricted spaces, such as integrating the mechanism into a larger torque distribution assembly.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. An epicyclic gear mechanism comprising:
   a fore secondary differential assembly comprising a first sun gear;
   an aft secondary differential assembly;
   a primary differential assembly comprising a primary carrier to transfer torque to selectively drive a first planet gear and a second planet gear; and
   a shaft comprising a second sun gear and extending from the primary differential through the fore secondary differential assembly and the aft secondary differential assembly,
   wherein the torque from the primary carrier creates rotational movement causing the first planet gear to selectively drive the fore secondary assembly via the first sun gear and the second planet gear to selectively drive the aft secondary assembly via the second sun gear.

2. The epicyclic gear mechanism of claim 1, wherein driving the shaft causes rotation of the aft secondary differential assembly.

3. The epicyclic gear mechanism of claim 1, wherein each of the fore and aft secondary assemblies rotate about a common central axis.

4. The epicyclic gear mechanism of claim 1, wherein the first sun gear and the second sun gear rotate about a common central axis.

5. The epicyclic gear mechanism of claim 1, wherein the primary carrier comprises a primary interface configured to transfer the torque to drive one or more of the fore or aft secondary differential assemblies in response to a mechanical input.

6. The epicyclic gear mechanism of claim 1, wherein the fore secondary differential assembly further includes a fore carrier in a fixed arrangement with the first sun gear, wherein rotation of the first planet gear drives the first sun gear causing rotation of the fore secondary differential assembly.

7. The epicyclic gear mechanism of claim 6, wherein the fore carrier further includes one or more planet gears such that the rotational movement of the fore secondary differential assembly about a common central axis selectively causes the one or more planet gears to rotate about a planet shaft.

8. The epicyclic gear mechanism of claim 7, wherein the fore carrier further includes one or more fore ring gears, the one or more planet gears within the fore carrier being configured to mesh with an interior gear of the one or more fore ring gears.

9. The epicyclic gear mechanism of claim 1, wherein the aft secondary differential assembly further includes an aft carrier, the aft carrier including one or more planet gears such that rotational movement of the shaft turns the aft carrier about a common central axis selectively causing the one or more planet gears to rotate about a planet shaft.

10. The epicyclic gear mechanism of claim 9, wherein the aft carrier further includes one or more aft ring gears, wherein the one or more planet gears within the aft carrier are configured to mesh with an interior gear of the one or more aft ring gears.

11. An epicyclic gear mechanism comprising:
    a fore secondary differential assembly comprising a first sun gear and one or more fore interfaces;
    an aft secondary differential assembly comprising one or more planet gears and one or more aft interface; and
    a primary differential assembly comprising:
       a first planet gear connected to the first sun gear;
       a second planet gear connected to a second sun gear; and
       a primary gear configured to transfer torque from a power source to the first planet gear to selectively drive the first sun gear, and to transfer torque from the power source to the second planet gear to selectively drive the second sun gear.

12. The epicyclic gear mechanism of claim 11, wherein the first sun gear and the second sun gear are arranged within a primary carrier.

13. The epicyclic gear mechanism of claim 11, wherein the primary differential assembly, the fore secondary differential assembly, the aft secondary differential assembly, each of the fore and aft interfaces, and the first sun gear and the second sun gear rotate about a common central axis.

14. The epicyclic gear mechanism of claim 11, further comprising a plurality of actuators to selectively activate or deactivate one or more interface wherein a selected actuator engages a braking system corresponding to the selected interface.

15. The epicyclic gear mechanism of claim 14, further comprising an electronic control unit to control activation of the actuators, wherein selection of a given interface activates a corresponding actuator to drive or be driven by the selected interface.

16. The epicyclic gear mechanism of claim 14, wherein the braking system comprises one or more of a grounding mechanism, an electrically configurable brake or a mechanically configurable brake, wherein the electrically configurable brake is actuated by application or removal of power to the electrically configurable brake, thereby engaging or disengaging the configurable brake, and wherein the mechanically configurable brake is actuated by application or removal of a mechanical force including a linear force or a rotational force.

17. An epicyclic gear mechanism comprising:
    a fore secondary differential assembly comprising one or more fore interfaces;
    an aft secondary differential assembly comprising one or more aft interfaces; and
    a primary differential assembly comprising a first planet gear connected to the fore secondary differential assembly and a second planet gear connected to the aft secondary differential assembly, and
    wherein an interface of the one or more fore or aft interfaces is configured to selectively receive mechanical power from a power source and transfer mechanical power to drive one or more of the other fore or aft interfaces.

18. The epicyclic gear mechanism of claim 17, wherein the primary differential assembly, the fore secondary differential assembly, the aft secondary differential assembly and each of the fore and aft interfaces rotate about a common central axis.

19. The epicyclic gear mechanism of claim 17, wherein the other fore or aft interfaces transfers mechanical power to an external load, and wherein the interface of the one or more fore or aft interfaces is configured to drive a primary interface of the primary differential assembly.

\* \* \* \* \*